June 13, 1961 H. C. HANSEN 2,988,366
SOUND REPRODUCING SYSTEMS
Filed Oct. 23, 1956 2 Sheets-Sheet 1
FIG. 1
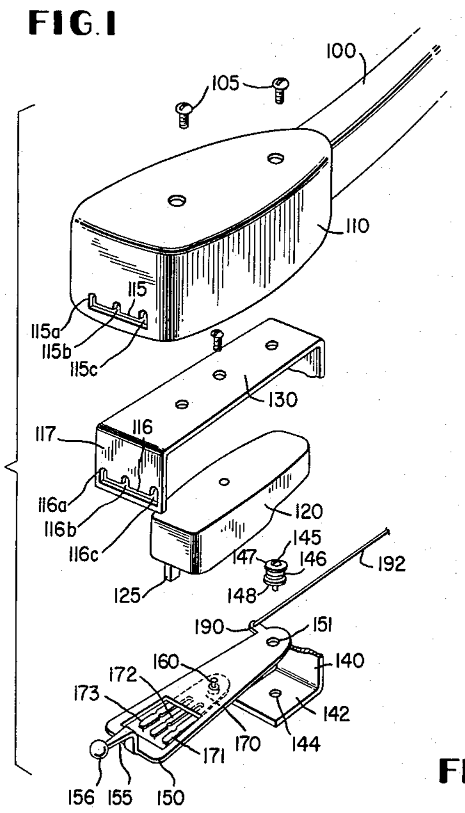
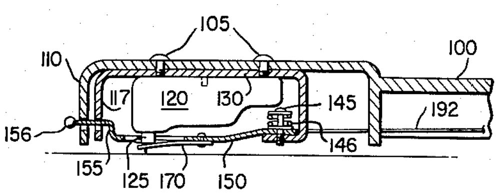
FIG. 2
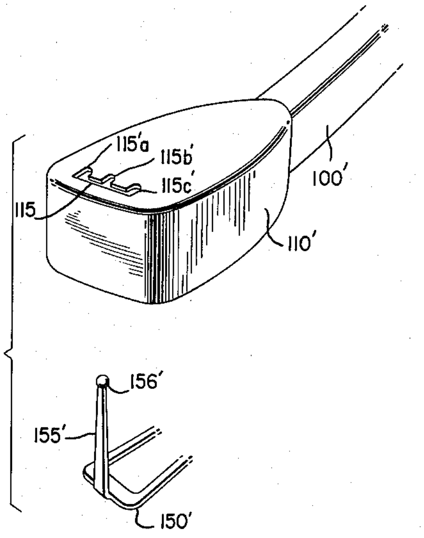
FIG. 3
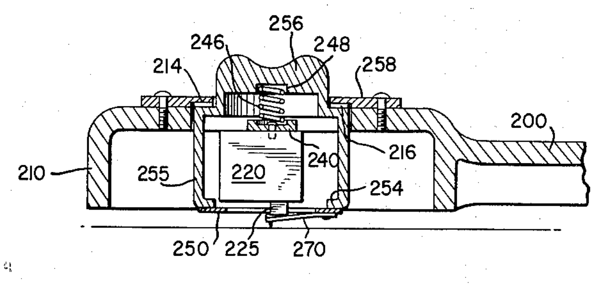
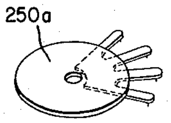
FIG. 6
FIG. 5
INVENTOR
HANS C. HANSEN
BY Dicke, Craig and Freudenberg.
ATTORNEYS June 13, 1961 H. C. HANSEN 2,988,366

SOUND REPRODUCING SYSTEMS

Filed Oct. 23, 1956

2 Sheets-Sheet 2

INVENTOR
HANS C. HANSEN

BY Dicke, Craig and Freudenberg

ATTORNEYS

United States Patent Office 2,988,366
Patented June 13, 1961

2,988,366

SOUND REPRODUCING SYSTEMS

Hans C. Hansen, 14 Christiansholmsvej, Copenhagen, Denmark

Filed Oct. 23, 1956, Ser. No. 617,807
Claims priority, application Great Britain Oct. 24, 1955
10 Claims. (Cl. 274—36)

Figures 4, 7, 8:
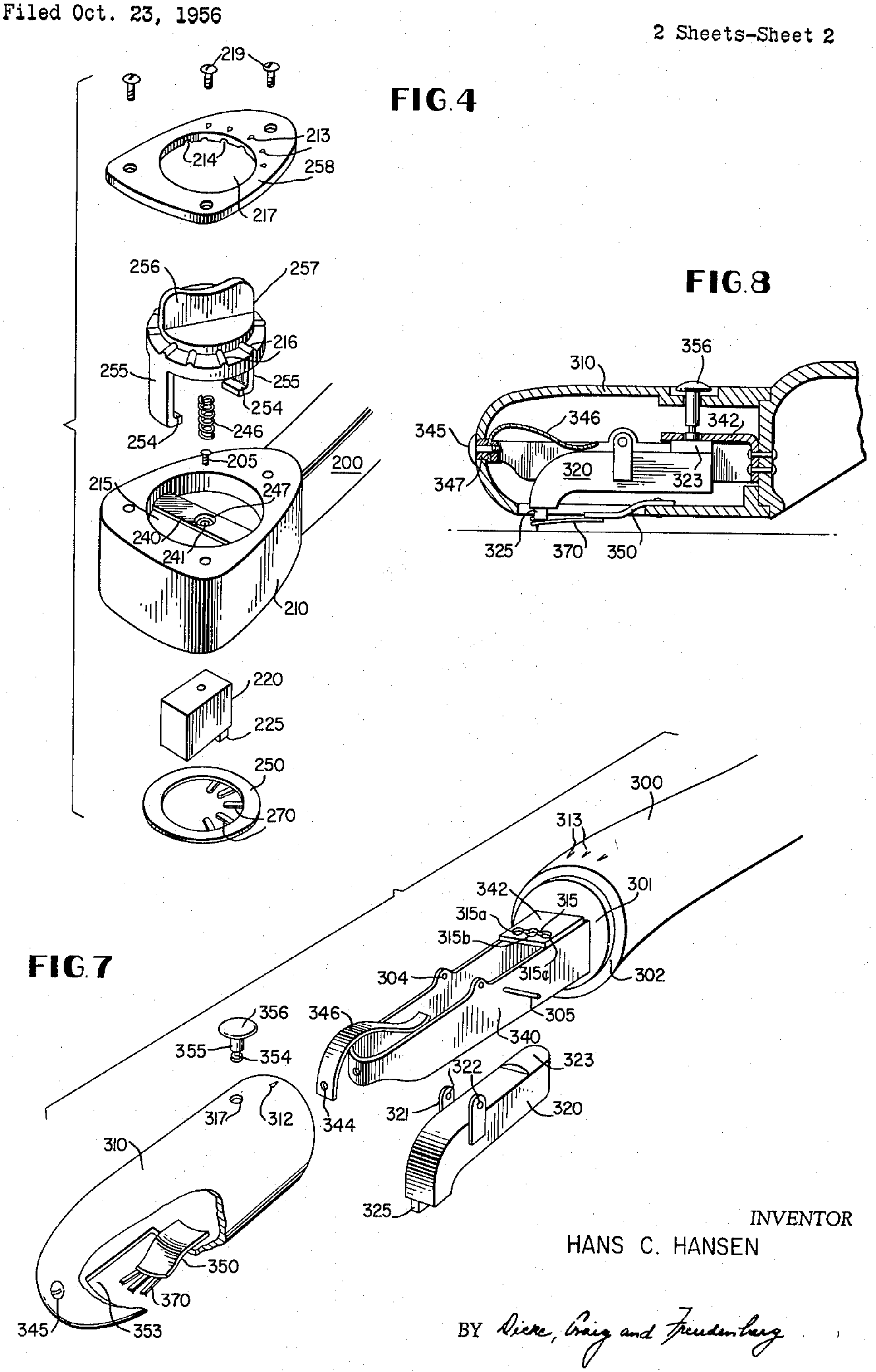

The present invention relates to sound reproducing systems and more specifically to such systems as commonly referred to as pickups.

It is a purpose of the invention to provide a sound reproducing system which enables three or more stylus members to be selectively brought into the operating position thereof.

It is a further purpose of the invention to provide a sound reproducing system having a plurality of stylus members to be brought selectively into the operating position thereof in which positioning means are provided for securing the adequate operating position of each of the stylus members.

A further purpose of the invention is to provide a sound reproducing system that is simple in construction and reliable in operation.

Still a further purpose of the invention is to provide a sound reproducing system in which it is possible to obtain a good frequency response.

Still a further purpose of the invention is to provide a sound reproducing system having selector means associated with the pickup head for selectively bringing a plurality of stylus members into the operative position thereof and in which said selector means will also be capable of selecting a desired needle pressure.

Still a further purpose of the invention is to provide a sound reproducing system having a plurality of stylus members each supported on a resilient supporting member that forms a tine of a fork and in which each of said members can be selectively brought into the operating position thereof relatively to a coupling member of a pickup cartridge.

Still a further purpose of the invention is to provide a construction of a sound reproducing system which enables use of three or more stylus tips of different characteristics to be alternatively brought into the operating position thereof.

Further purposes and features of my invention will appear from the following specification in connection with the drawings in which:

FIGURE 1 is an exploded view of a pickup head provided with a stylus changing arrangement according to the invention, FIGURE 2 is a section through the pickup head in FIGURE 1, FIGURE 3 is a schematic exploded view of a modification of a pickup head according to FIGURE 1, FIGURE 4 is an exploded view of another embodiment of a pickup head according to the invention, FIGURE 5 is a section through the pickup head in FIGURE 4, FIGURE 6 is a modification of the stylus supporting member in FIGURE 4, FIGURE 7 is an exploded view of another embodiment of a pickup head according to the invention, and FIGURE 8 is a section through the pickup head in FIGURE 7.

The embodiment according to FIGURES 1 and 2 includes a tone arm 100, a pickup casing 110, a crystal type pickup cartridge structure 120 having a portion in the form of a coupling or transmission member 125 for being engaged by a stylus member to transmit the mechanical movements of the stylus members to the pickup unit which may be of the piezo-electric type and a supporting member or carrier 150 for a plurality of stylus members each of which is mounted on an elastic stylus holder.

The pickup cartridge 120 is secured by means of screws to a bracket 130 which is secured inside the pickup casing 110 by means of two screws 105. At the rear end the bracket has a downwardly extending plate 140 which continues in a horizontal portion 142 having a screw-threaded hole 144. The supporting member or carrier 150 is held in a substantially horizontal position, swingingly as well as tiltably supported on the bracket portion 142 by means of a screw that extends through a hole 151 in the rear end of the support 150. The diameter of the hole 151 is slightly larger than the diameter of the screw 145 so as to allow the support 150 to be slightly tilted in a plane perpendicular to the plate member 140. A spring 146 between two washers 147 and 148 on the screw 145 tends to maintain the support 150 in alignment with the plate portion 142.

The support 150 is of elongated triangular form and has at its front end an arm 155 extending through an elongated slot 116 in a downwardly extending flap 117 in the front end of the bracket 130. The arm 155 is provided with a control knob 156 or the like for manual operation. The slot 116 is provided with three upwardly extending notches or transverse slots **116*a*, 116*b* and 116*c*, and the mutual positions of the parts are so designed that the arm 155 normally will be pressed up in a selected one of the notches 116*a*, 116*b* or 116*c* due to the action of the spring 146, and thereby be locked in a predetermined angular position. The front wall of the pickup head casing 110 has an aligning slot 115 with transverse notches 115*a*, 115*b* and 115*c***.

Below the support 150 a stylus member unit 170 comprising three stylus members is mounted for example by means of a rivet 160. Each stylus tip is mounted at the front end of a stylus holder in the form of a cantilever spring 171, 172, 173 respectively, these cantilever springs being resilient in both horizontal and vertical direction and biased against the underside of the carrier plate 150 which adjacent its front end has an aperture 153 in which the front ends of the stylus holders are unexposed and through which the coupling member 125 of the pickup cartridge 120 can be selectively engaged by each of the three stylus members.

The support 150 is at its rear end provided with a sidewardly extending arm 190, the end of which by means of a rod, a wire or the like 192 is connected to a balancing member (not shown) for the tone arm.

When the control knob 156 is pressed down by the operator to a position with the arm 155 in the transverse slot 116, against the tension of the spring 146, the carrier 150 will be in a position in which all of the three stylus holders are below the coupling member 125. In this position the carrier 150 can swing freely about the pin 145, i.e. the arm 155 can be moved freely in the slot 116. In each of the positions of the support 150 in which the arm 155 is located just below one of the upwardly extending notches, **116*a*, 116*b*, 116*c*, the front end of one of the cantilever springs 171, 172 or 173 will be located below the coupling member 125. If, for example, the notch 116*c* is selected, the cantilever spring 173 will be in vertical spaced relationship to the coupling member 125. When thereafter the arm 155 is allowed to enter the notch 115*c* the carrier 150 will tilt upwards so as to bring the cantilever spring 173 into physical engagement with the coupling member 125. This engagement takes place already during the initial part of this upward tilting and due to the bias of the stylus holders against the underside of their common carrier the selected cantilever spring will be bent downwards relatively to the support 150** while the cantilever springs 171 and 172 will tilt upwardly with the carrier 150 to assume a position in which their stylus tips are above that of the cantilever spring 173. The various parts are dimensioned and mounted in such a manner that the stylus tip of the selected cantilever spring, in the present case the spring 173, will be the lowest point of the entire pickup head assembly.

Thus it will be understood that the stylus tip selected in this manner will be ready for engaging the sound groove of the record and for transmitting the mechanical oscillations when playing the records to the crystal in the pickup cartridge 120.

It will be understood that each of the three stylus members can be selected in a corresponding manner. To secure an adequate pressure of the stylus members against the crystal as well as for retaining the non-selected stylus members in a predetermined plane, the stylus member unit 170 is mounted on the support 150 with the cantilever springs biased upwards against the support 150.

It will be seen that this construction of a needle arrangement is simple and easy to manufacture. The number of stylus means in the structure can be extended to four or more.

The sidewardly extending arm 190 at the rear end of the support 150 will follow the movement of the carrier 150 perpendicular to its tilting, i.e. during passage of the arm 155 in the slot 115. The arm 190 will assume different angular positions corresponding to the three different operative positions of the support 150, and thereby be able to transmit a movement through a rod 192 to the balancing member (not shown) of the pickup arm so as to adjust the needle pressure to respond to a value assigned to the stylus member selected.

It will be understood that in this manner the three selecting movements of the carrier 150 for the stylus members can be utilized for setting the pickup arm balancing means.

It will be understood that the needle changing arrangement is not restricted to be connected with a needle pressure changing arrangement.

In FIGURE 3 is schematically shown a modification of the manually operating arrangement according to FIGURES 1 and 2. The guiding slot 115′ is here provided in the top wall of the pickup casing 110′ and the handle 155′ extends vertically up through the slot arrangement 115′, *a*′, *b*′, *c*′. For bringing the support 150′ to its neutral, lower position, the knob 156′ must be moved forwards so as to cause the support 150′ to tilt in a vertical plane by overcoming the tension in the spring 146′ and so as to bring the arm 155′ out of engagement with the notch.

FIGURE 4 shows another embodiment of a pickup head according to the invention. In this system a stylus member support is mounted for revolving movement to be brought to a neutral position by being pressed and thereafter to a free selecting position by being turned to the desired position and thereafter to an operating position by being moved upwards so as to bring the selected stylus member into engagement with the pickup crystal.

The assembly comprises a pickup casing 210, a disc shaped control member 257, a cover plate 258 for the control member 257, a pickup cartridge 220 and a stylus holder carrier 250.

The top plate of the pickup casing 210 is provided with a circular hole 215 having a transverse member 240, the top surface of which is located at a lower level than the top surface of the pickup casing 210. The transverse bar 240 is provided with a central, circular depression 247 and with a central hole 241. The pickup cartridge 220 is mounted below the transverse bar 240 by means of a screw 205 through the central hole 241.

The control member 257 is provided with two downwardly extending arms 255 each having an inwardly bent portion 254 at its lower end. Furthermore the member 257 has an upwardly extending finger grip 256 and a plurality of peripheral radially extending ribs 216 in a plane lower than the plane of the upper surface of the control member 257.

Between the depression 247 in the cross bar 240 and a central depression 248 in the underside of the control member 257 a spring 246 is interposed which tends to press the control member 257 upwards. A cover plate 258 having a circular hole 217 for receiving the upper part of the control member 257 is secured by means of screws 219 to the top side of the pickup casing 210 so as limit the upward movement of the control member 257 under the action of the spring 246. The underside of the cover plate 258 has adjacent its periphery a plurality of radially extending notches 214 adapted to be engaged by the radial ribs 216 on the control member 257.

The stylus carrier 250 is secured to the inwardly bent portions 254 of the downwardly extending control arms 255 in coaxial alignment with the control member 257. To the underside of the supporting member 250 five radially inwardly extending stylus members 270 are secured in the same angular relationship as the angular relationship between the ribs 216 on the control member 257 and of the notches 214 in the cover plate 258.

It will be seen that the control member 257 in this manner is rotatably mounted with a certain play in the vertical direction. The parts are so dimensioned that one selected stylus member will be in operative connection with the transmission member 225 of the pickup cartridge 220 when the control member 257 is in its uppermost position in which the ribs 216 on the control member 257 engages the corresponding notches 214 in the underside of the cover plate 258. When the control member 257 is pressed downwards against the action of the spring 246 the supporting member 250 will be moved so far downwards so as to bring any of the stylus members selected out of engagement with the transmission member 125 to a position below the underside thereof. It will be seen that in this position it is possible to turn the control member by means of the finger grip 256 to another position in which another stylus member is situated below the transmission member 125. In such a position indicated by means of marks 213 at the top of the cover plate 258 the ribs 216 will again be in position below the notches 214. When thereafter the control member 257 is allowed to move upwards the stylus member selected in the angular position of the control member will engage the underside of the transmission member 125 and the other stylus members, except the selected one, will be brought to a higher level.

Also in this case the movement of the control member can be utilized to move transmission means connected to the pickup arm balancing means for setting said balancing means to obtain a needle pressure corresponding to the needle selected. The actual arrangement for this purpose may be constructed in various manners and is not indicated at the drawings.

In FIGURE 6 is shown a modification of a stylus means supporting member according to FIGURES 4 and 5. This member consists of a small disc 250*a* with the stylus means mounted thereon extending radially outwards. It will be understood that this member may be included in a needle changing construction the principles of which have been set forth in the foregoing.

While in the embodiment shown in FIGURES 1–6 the neutral three selecting positions of the stylus members in which all stylus members are disengaged from the transmission member of the pickup cartridge are obtained by moving the common stylus means supporting member downwards from the pickup cartridge that is rigidly secured to the pickup casing, the same relative movement between the two parts is obtained in the embodiment according to FIGURES 7 and 8 by tilting the pickup cartridge in a vertical plane so as to thereby move the transmission out of engagement with the stylus member.

In the neutral position of the pickup cartridge obtained in this manner the common stylus supporting member is moved so as to pre-select the desired stylus member whereafter the cartridge is tilted back to bring the stylus selected to its operative position by pressing it downwards without pressing the stylus members downwards.

This embodiment includes a tone arm 300, a pickup casing 310 mounted on the pickup arm and rotatable around its longitudinal axis, a pickup cartridge 320 having a transmission member 325 and a support 350 for a number of stylus members.

The pickup arm 300 has at its front end a plate 301 having a circular recess 302. A longitudinal bracket 340 having two side walls with holes 304 to support the pickup cartridge extends outwardly from the end plate 301. The pickup cartridge 320 is provided with two upwardly extending arms 321 with holes 322 at their top ends, and a pin 305 extends through the holes 304 and 322 to tiltably support the pickup cartridge 320.

The pickup casing 310 is at its underside provided with a rectangular aperture 353 through which the stylus members 370 on the support or carrier 350, which is rigidly secured to the upper surface of the underside of the pickup casing 310, are capable of being pressed down one by one being engaged by the transmission member 325 on the pickup cartridge 320.

The tubular rear end of the pickup casing 310 fits into the groove 302 of the end plate 301 on the pickup arm 300 and is rotatably secured at its front end to the front wall of the bracket 340 by means of a screw 345 through a distance piece 347 and a screw threaded hole 344 in the front wall of the bracket 340. Between the distance piece 347 and the end wall of the bracket 340 is sandwiched a leaf spring 346 which is bent so as to press the front end of the pickup cartridge downwards to engage one of the stylus springs.

The bracket 340 has a bent-over horizontal portion 342 forming a limit for the upward movement of the rear end of the pickup cartridge 320 and thereby together with the spring 346 defines the lowest position or the rest position of the transmission member 325. The plate 342 is provided with a transverse slot 315 having a plurality of circular widenings 315*a*, 315*b*, 315*c*. The slot 315 *a, b, c,* is adapted to cooperate with a control member 355 in form of a pin having an annular groove 354 and at its top end a knob 356. This control pin extends down through a hole 317 in the upper side of the rear end of the pickup casing 310 and through the slot 315 so as to engage the upper surface of the rear end of the pickup cartridge 320 with its lower end. This end of the cartridge has an arcuate surface 323 approximately coaxial with the axis of the rotatable pickup casing 310.

When operating the pickup assembly in FIGURES 7 and 8 for interchanging two needles the pickup head is gripped by one hand and the control knob 356 is pressed down with a finger whereby the pickup cartridge will be tilted about the pin 305 against the action of the spring 346 so as to bring the transmission member 325 up to a level in which it is out of engagement with the stylus members, i.e. to the neutral position. Simultaneously the control pin 355 will be in a position in which the annular groove 354 aligns with the slot 315 so that it can move through the slot in the transverse direction. For selecting another stylus member the pickup casing 310 together with the control member 356 is rotated until the indicating arrow 312 reaches the desired selection mark 313 on the pickup arm 300. When this position is reached the control member 356 is released whereafter the spring 346 will cause the pickup cartridge to be retilted to its normal position, the lower end of the control pin 355 going up in the corresponding widened portion 315 *a*, *b* or *c* of the slot 315 and the rear end 323 of the pickup cartridge abutting against the underside of the plate 342. By this re-tilting the transmission member 325 of the pickup cartridge 320 will press down that one of the stylus members 370 which has been selected to an extending or projecting position in which it will be able to engage the sound track of a record. The stylus members not selected will remain in the position at a higher level.

It will be understood that this construction can also be provided in a simple way with any number of stylus members.

It will be appreciated that the changing movement in this construction is very simple and can be carried out easily by means of one hand, no matter whether the pickup arm is resting on a support or not.

The invention is not limited to the embodiments described hereinabove with reference to the drawings inasfar as a plurality of modifications will be possible within the scope of the invention.

One important feature of the invention resides in the use of a plurality of stylus fingers extending in substantially the same direction and in rather close proximity like fingers in a fork.

Said fingers are by means of a suitable guiding member or control member movable substantially in a plane that includes said fingers. Preferably said movement is limited between two, exterior positions in which the two exterior fingers are in substantial vertical alignment with said member capable of transmitting said mechanical movements. Furthermore said fingers are movable in a direction perpendicular thereto in a plurality of positions controlled or guided by said control means or guiding means.

Another feature of the invention resides in the use of a common support for said plurality of fingers, said common support being associated with a part of said guiding or control mechanism for the movement of said finger.

Another feature of the invention resides in having said fingers in the form of a separate member that is secured to said common support in such a position that said fingers are engaging said support slightly biased thereagainst.

I claim:

1. A pickup cartridge structure including in combination: a crystal element structure having a contact portion for being engaged by a stylus member, a stylus structure including a carrier member and a plurality of resilient stylus members secured on said carrier member and each being biased thereagainst, said stylus members being arranged in substantial parallel relationship like fork tines and having exposed extending ends, means for controlling lateral movement of said stylus structure relatively to said crystal element in a plane with said exposed ends of said stylus members passing across said contact portion of said crystal element in spaced relationship thereto, a control member extending from said stylus structure, a guiding slot for said control member having a portion operable to retain said spaced relationship during said lateral relative movement and a plurality of transverse portions operable to receive said control member to selectively allow engaging and disengaging between each of said stylus members and said crystal element portion by movement perpendicular to said lateral movement, and resilient means for biasing said exposed ends of said stylus members against said contact portion.

2. A pickup cartridge structure including in combination: a crystal element structure having a contact portion for being engaged by a stylus member, a stylus structure including a carrier member and a plurality of resilient stylus members secured on said carrier members and each being biased thereagainst, said stylus members being arranged in substantial parallel relationship like fork tines and having exposed extending ends, means for causing lateral relative movement between said crystal element and said stylus structure with said exposed ends of said stylus members passing across said contact portion of said crystal element in spaced relationship thereto, a control structure comprising a pin-and-slot connection operable to retain said spaced relationship during said lateral relative movement as well as operable to selectively allow engaging and disengaging between each of said stylus members and said crystal element portion by movement perpendicular to said lateral movement, and resilient means for biasing said exposed ends of said stylus members against said contact portion.

3. In a phonograph pickup assembly the combination: a crystal member for converting mechanical vibrations into electrical oscillations and having a portion to be operatively engaged by a stylus member, a stylus assembly including a carrier member and a plurality of resilient stylus holders each having a stylus member secured thereto and each being supported on said carrier member, supporting means for supporting said carrier member relative to said crystal member in such a manner as to enable relative movement between said carrier member and said crystal member in two mutually exclusive planes to cause engagement and disengagement between each of said stylus holders and said crystal member portion in a direction substantially perpendicular to said portion as well as enable lateral movement relatively thereto for selectively bringing each of said stylus members into alignment with said crystal member portion, and control means operable at will and operatively connected with one of said crystal member and stylus assembly for selectively causing said movement in both said directions.

4. In a phonograph pickup assembly the combination: a crystal member for converting mechanical vibrations into electrical oscillations and having a portion to be operatively engaged by a stylus member, a stylus assembly including a carrier member and a plurality of resilient stylus holders each having a stylus member secured thereto and each being supported on said carrier member, resilient supporting means for resiliently supporting said stylus assembly relative to said crystal member, and control means for causing relative movement between said carrier member and said crystal element structure in a direction to engage and disengage each of said stylus holders with said crystal element portion in a direction substantially perpendicular to said portion as well as for causing lateral movement substantially perpendicular thereto for selectively bringing each of said stylus members into alignment with said crystal element portion.

5. In a phonograph pickup assembly the combination of a crystal element structure having a portion to be engaged by a stylus member for causing mechanical vibrations of said stylus member during its passage in the sound grooves of the phonograph record to be transmitted to said crystal element for being converted into electrical oscillations, a stylus assembly having a carrier member and a plurality of elastic resilient stylus holders biased thereagainst, said stylus assembly being movably mounted relative to said crystal element portion for passing laterally across said portion in spaced relationship thereto as well as enable movement towards and away from said crystal element portion, and control means operatively connected with said carrier member and operable to control movement of said carrier member in a direction substantially perpendicular to said crystal element portion in a plurality of positions thereof to thereby selectively cause engagement and disengagement of each of said stylus members against said crystal element portion as well as to control lateral movement of said carrier member in a plane with said stylus holders spaced from said crystal element portion.

6. In a phonograph pickup in combination: a tone arm, a pickup cartridge carried by said tone arm and including a member capable of converting mechanical oscillations into electrical oscillations and having a coupling member provided with a surface adapted to be engaged by a stylus holder, a stylus assembly including a plurality of stylus members each mounted on an elastic stylus holder for being brought alternatively into engagement with said coupling member, a common stylus holder carrier mounted for movement in a plane substantially parallel with said coupling member surface as well as mounted for being tilted substantially perpendicular to said plane, means operable to limit the tilting of said carrier member in the direction against said coupling member, means for mounting said stylus holders in resilient engagement with a surface portion of said carrier member remote from said coupling member biased against said surface portion, and positioning means for said carrier member to control its tilting in each of said positions in which said stylus supporting member aligns with said coupling member for selectively bringing each of said stylus holders into physical contact with said coupling member.

7. In a phonograph pickup in combination: a tone arm, a pickup cartridge carried by said tone arm and including a member capable of converting mechanical oscillations into electrical alternating voltage and having a coupling member, a stylus assembly including a carrier having an edge and a plurality of resilient fingers mounted thereon mounted for movement in a plane substantially parallel with the surface of said coupling member as well as mounted for tilting in a plurality of positions perpendicular to said plane, means operable to limit the tilting of said carrier member in the direction against said coupling member, means for mounting said stylus supporting members in resilient engagement with a surface portion of said carrier member remote from said coupling member biased against said surface portion, and positioning means for said carrier member to control its tilting in each of said positions in which said stylus supporting member aligns with said coupling member for bringing each of said stylus supporting members into physical contact with said coupling member.

8. In a phonograph pickup assembly the combination of a crystal element structure having a portion to be engaged by a stylus member for causing mechanical vibrations of said stylus member during its passage in the sound grooves of the phonograph record to be transmitted to said crystal element for being converted into electrical oscillations and a stylus assembly movably mounted relative to said crystal element portion for passing said portion in spaced relationship thereto as well as for being moved towards and away from said crystal element portion, said stylus structure having a carrier member and a plurality of elastic resilient stylus holders biased thereagainst, control means operable to cause relative tilting between said carrier member and said crystal element structure in a plurality of positions to selectively cause engagement and disengagement of each of said stylus members against said crystal element portion, and further control means operable to cause relative lateral movement between said carrier member and said crystal element structure between said tilted positions.

9. A phonograph pickup cartridge having a crystal element including a contact portion and being capable of converting mechanical oscillations of a stylus means which is in physical contact with said contact portion into electrical oscillations comprising in combination with said crystal element a pluralty of stylus means each including an elongated flexible stylus member carrying adjacent one end a stylus tip, a carrier member having an edge, means securing said flexible stylus members on said carrier member in a position with said ends of said stylus member which are carrying said stylus tips extending beyond said edge of said carrier member and biased against said carrier member, selector means operable at will for moving said carrier member relatively to said contact portion of said crystal element to selectively position a selected one of said stylus members in coupling position with respect to said contact portion of said crystal element, resilient means operable to bias said carrier member in a direction against said crystal element contact portion in each of said coupling positions to cause the selected one of said stylus members to be biased against said contact portion and means for preventing movement of said carrier member in the direction towards said crystal element except in each of said coupling positions.

10. A phonograph pickup cartridge having a crystal element including a contact portion and being capable of converting mechanical oscillations of a stylus means which is in physical contact with said contact portion into electrical oscillations comprising in combination with said crystal element a plurality of stylus means each including an elongated flexible stylus member carrying adjacent one end a stylus tip, a carrier member having an edge, means securing said flexible stylus members on said carrier member in a position with said ends of said stylus members which are carrying said stylus tips extending beyond said edge of said carrier member and biased against said carrier member, selector means operable at will for moving said carrier member relatively to said contact portion of said crystal element, means allowing lateral movement of said carrier member only when said stylus members are spaced from said contact portion to selectively position a selected one of said stylus members in coupling position opposite said contact portion, resilient means operable to bias said carrier member in a direction against said crystal element contact portion, and means allowing movement of said carrier member in each of said coupling positions only to cause the selected one of said stylus members to be biased against said contact portion.

References Cited in the file of this patent

UNITED STATES PATENTS

| | | |
|---|---|---|
| 2,816,056 | Harris | Dec. 10, 1957 |

FOREIGN PATENTS

| | | |
|---|---|---|
| 498,211 | Belgium | Oct. 14, 1950 |